UNITED STATES PATENT OFFICE.

DUBOIS D. PARMELEE, OF NEW YORK, N. Y., ASSIGNOR TO CHARLES L. RICHARDS, OF SAME PLACE.

IMPROVEMENT IN THE MANUFACTURE OF HARD RUBBER.

Specification forming part of Letters Patent No. 48,993, dated July 25, 1865.

*To all whom it may concern:*

Be it known that I, DUBOIS D. PARMELEE, of New York, in the county and State of New York, have invented a new and useful Mode of Treating India-Rubber, whereby a hard, flexible, and elastic product may be produced resembling ivory, horn, or whalebone in its physical properties, and to which may be imparted fine colors or tints at the pleasure of the operator, and employed in the arts for various useful purposes, such as pencil and pen cases, buttons, articles of jewelry, combs, knife-handles, and other articles of ornament or usefulness; and I hereby declare that the following is a full, clear, and exact description of the same, or of the manner in which the same is or may be carried into effect.

I take, for example, the Para india-rubber bottles as found in commerce, and which consist of masses of rubber smoked on the outside, and consequently holding some creosote, as well as lamp-black, which gives the coating a black color. The interior of this bottle is a comparatively clean and cream-colored or transparent gum. After washing all dirt off from the outside of the bottle, I separate the rind of rubber by peeling off the black envelope, which I employ for the production of black hard rubber. The inside is used for the manufacture of colored hard rubber. The rubber is then passed through the mullers or masticators in common use by all manufacturers of india-rubber until it is reduced or attenuated into thin sheets. These sheets are hung in drying-chambers at a temperature of 100° to 150° for about one week, or until the moisture always contained in commercial caoutchouc is driven off. The dried rubber is then remasticated in the mullers and then passed through the ordinary colanders or spreaders and formed into sheets of desired thickness for the purpose of forming tubes, small sheets or tablets, or other forms required. These forms or articles are now ready for the chemical treatment which converts the rubber into a hard product. To effect this change the articles are brushed over their surfaces with a solution of protochloride of sulphur in bisulphide of carbon in the proportion of three parts of the former in one hundred of the latter. This is called the "setting" process, which removes all tackiness from the surface of the rubber, while it forms an envelope or very thin skin, so to speak, inclosing the whole form, which prevents disfiguring of and damage to the goods from the handling necessary in the subsequent treatment. The forms or articles are then immersed in a solution of two and a half parts of protochloride of sulphur in one hundred parts of bisulphide of carbon for a time varying with the thickness of the articles under treatment, and which the practical operator soon learns from observing the degree of expansion which takes place in the india-rubber. For articles of the thickness of one-eighth of an inch fifteen minutes will be sufficient. The rubber is next taken out of this solution carefully and placed in cold water, and there left until it has contracted nearly to its original dimensions, which will be, in case of the example above referred to, in about five hours. It is then taken and exposed to air of common temperature for three or four hours, when it is put into the drying-room and treated precisely as pointed out for the crude gum in the first stages of the proceedings, for the purpose of removing dampness. At this stage of the operation a product is obtained which resembles in its principal properties the soft vulcanized caoutchouc of Charles Goodyear, deceased, and for which Letters Patent of the United States were issued to him on the 15th June, 1844. This soft elastic rubber is then taken and immersed again in a solution of one and a half parts of protochloride of sulphur in one hundred parts of bisulphide of carbon for about three hours, when it is taken out and immersed in a stronger solution of two and a half parts of chloride of sulphur in one hundred parts of bisulphide of carbon, and left in this solution until the required hardness has been attained, which will usually be in about four hours longer. The rubber, now hardened, is next exposed to the atmosphere of common temperature for a few hours. The surfaces are then ground to remove the thin coating of sulphurous matter which collects thereon, and after a further exposure to warm air the bisulphide of carbon volatilizes, and the articles may be highly polished by the same process employed for polishing horn, ivory, and vulcanite.

The above product is translucent when in thin sheets, and resembles closely the natural color of horn.

For obtaining a fine black product the outside portion of the bottle is taken and ground with refined lamp-black, and in case weight and greater solidity is desired carbonate of lead is also added. The proportions of these ingredients admit of great variations, and depend upon the toughness, elasticity, &c., desired, or, in other words, upon the purpose for which the product is designed. If flexibility be not an object, as in case of knife-handles, &c., well-dried, calcined, ground, and bolted clay, as free from iron as possible, may also be added to the lead and lamp-black.

If a white product is desired, the inside portion of the commercial india-rubber bottle is employed and white lead is ground with it, together with carbonate of baryta or kaolin, in quantity proportionate to the degree of toughness desired. The larger the proportion of these pigments the less tough will be product obtained.

For a blue-colored product, ultramarine is added to the compound containing the white pigments.

By the quantity of the ultramarine employed the depth of the color may be regulated. No particular rule can be indicated, as this is necessarily left to the judgment or taste of the operator.

I would observe that the color will not be altered or affected by subsequent treatment of the compound.

For a red-colored compound I add to the white compound minium, or what is commonly known as "red lead."

Yellow hard rubber is produced by adding chrome-yellow to the white compound.

A green product is obtained by grinding the blue and yellow pigments together and embodying the same in the compound, a purple compound by grinding the red and blue pigments together, and an orange-colored mass is produced by adding a little of the red compound to the yellow.

Many other colors may be obtained by different combinations of coloring-matter and by varying the proportions of the ingredients.

I am aware that india-rubber has heretofore been converted into a hard substance by means of a process which consisted in immersing india-rubber directly in a solution of two and a half parts of chloride of sulphur in one hundred parts of bisulphide of carbon, keeping the rubber immersed until the hardening effect had taken place; but by that process or mode of procedure the india-rubber was not only warped out of shape, but cracked and split into a great number of small fragments by the unequal hardening, and consequently contraction, of the particles, while the product obtained was too hard, brittle, or glass-like to be of any use or available in the arts. It will be seen, therefore, that the object of my said said invention is to remedy these difficulties, and I have accomplished the same by first producing a soft flexible elastic product resembling soft vulcanized rubber, and by then hardening the said soft flexible elastic product in the manner hereinbefore described. By this means a hard-rubber compound may be obtained which possesses all the properties of good hard, elastic, and flexible vulcanite, with the additional advantage that it may be produced colored, as hereinbefore set forth.

In conclusion, I may observe that the hard-rubber compound produced in accordance with this my invention may be worked in the same way as vulcanite or hard rubber made in accordance with the patent of Nelson Goodyear of May 6, 1851. It may be cut, turned on a lathe, and the cutting or turnings or waste in the manufacture of hard-rubber articles may be ground into a fine powder and molded in many articles of usefulness or ornament by submitting it in hot molds to pressure. The particles are thus fused or welded together.

I would further observe that all the gums allied to india-rubber, such as gutta-percha or the various combinations of different gums, may be treated in like manner with similar effect; also, that by graduating the strength of the solution — i. e., by gradually increasing the proportion of protochloride of sulphur in the solution—the compound will be rendered more elastic.

Having thus described my invention and the manner in which the same is or may be carried into effect, I shall state my claims as follows:

1. As a new manufacture, the production of a hard, or hard and flexible, or hard, flexible, and elastic, compound by the process herein described, the same consisting, substantially, in first converting india-rubber or like gums into a soft, flexible, and elastic product resembling soft vulcanized rubber by immersion of the rubber in a solution of protochloride of sulphur and bisulphide or carbon in the manner described, and in converting the soft, flexible, and elastic product into a hard, or hard and flexible, or hard, flexible, and elastic, product by immersing the product of the first immersion in a solution of protochloride of sulphur and bisulphide of carbon, substantially as herein set forth.

2. As a new product or substance, a hard, or hard and flexible, or hard, flexible, and elastic, compound composed of india-rubber or other similar gum which has been subjected to two or more immersions in solutions of protochloride of sulphur and bisulphide of carbon, substantially as herein described.

3. As a new manufacture or substance, colored hard, or colored hard and flexible or elastic, compound composed of rubber having incorporated with it colored pigments, as described, and subjected to successive immersions in solutions, substantially as set forth.

In testimony whereof I have signed my name to this specification before two subscribing witnesses.

DUBOIS D. PARMELEE.

Witnesses:
A. POLLOK,
EDM. F. BROWN.